Nov. 19, 1963  J. P. BAGBY  3,111,071
AUTOMATIC EXPOSURE CONTROL DEVICES
Filed Oct. 6, 1960  4 Sheets-Sheet 2

INVENTOR.
John P. Bagby
BY Robert F. Michle
Atty.

United States Patent Office 3,111,071
Patented Nov. 19, 1963

3,111,071
AUTOMATIC EXPOSURE CONTROL DEVICES
John P. Bagby, Skokie, Ill., assignor to Bell & Howell Company, Chicago, Ill., a corporation of Illinois
Filed Oct. 6, 1960, Ser. No. 60,858
15 Claims. (Cl. 95—10)

This invention relates to automatic exposure control devices, and more particularly to automatic exposure control devices of at least partially the needle entrapment type.

An object of the invention is to provide new and improved automatic exposure control devices in which at least one diaphragm blade is permitted by shutter actuation to close to the extent permitted by a movable member of a light responsive mechanism.

Another object of the invention is to provide automatic exposure control devices in which a galvanometer drives only one of two diaphragm blades and the other blade is permitted to be moved manually to an extent permitted by the position of the galvanometer.

Another object of the invention is to provide an automatic exposure control device in which a galvanometer coil carries a diaphragm blade and a second blade is urged into engagement with a portion of the coil when a shutter releasing member is actuated.

Another object of the invention is to provide automatic exposure control device having a light senstive mechanism adapted to move a member in accordance with scene illumination and a diaphragm blade normally held in a wide open position and permitted to move in a closing direction into engagement with the member when the shutter is released with camming structure provided on the member or the blade to limit closing movement of the blade in accordance with the position of the member.

Another object of the invention is to provide an automatic exposure control device in which one of two diaphragm blades is driven by a galvanometer to a position determined by scene lighting and the other blade is actuated manually to a position determined by the position of the first blade, one of the blades having a cam member and the other having a follower for engaging the cam member.

A complete understanding of the invention may be obtained from the following detailed description of automatic exposure control devices forming specific embodiments thereof, when read in conjunction with the appended drawings, in which.

Figure 1:
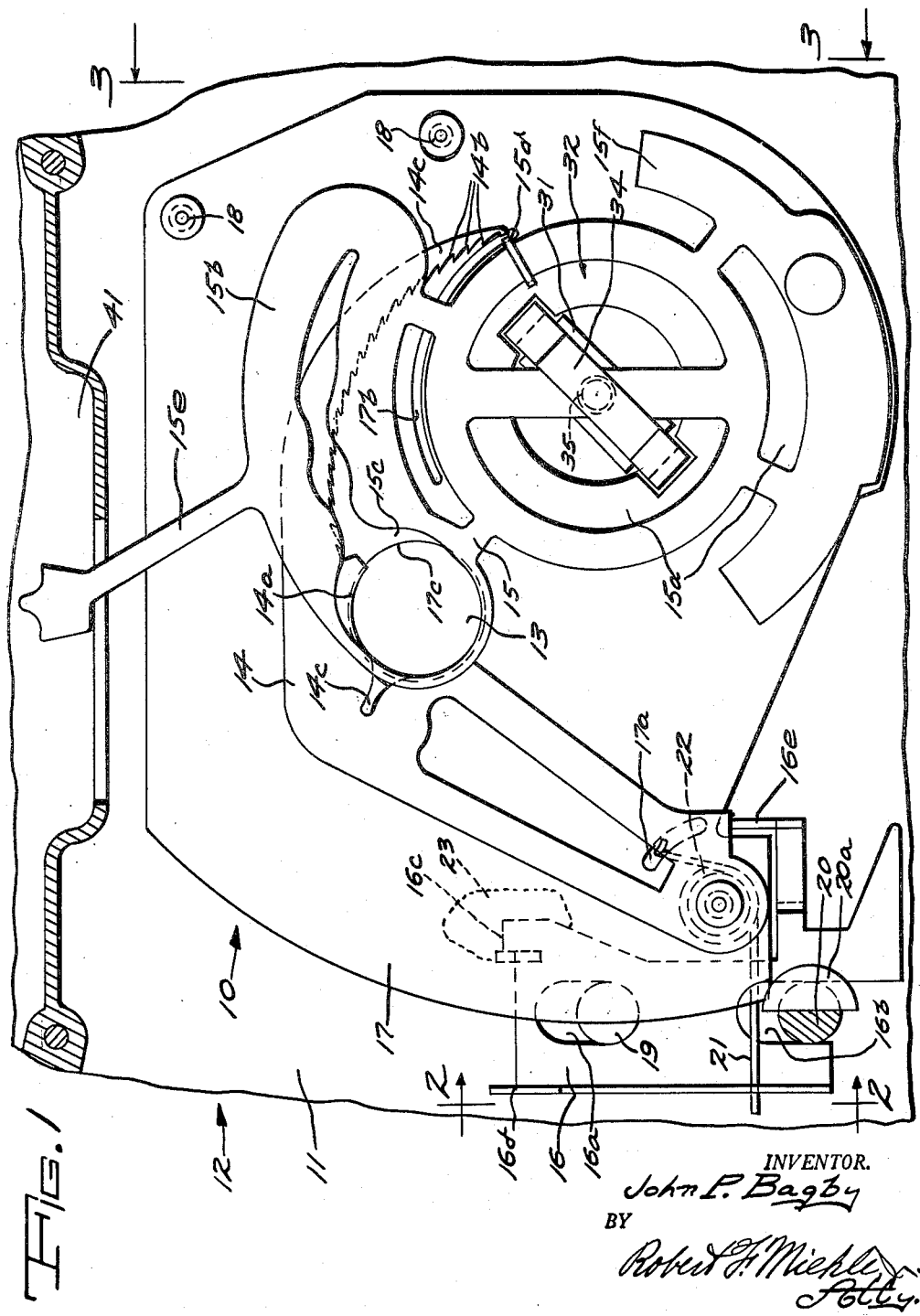
FIG. 1 is a fragmentary, partially sectional, front elevation view of a camera having an automatic exposure control device forming one embodiment of the invention.

The invention provides an automatic exposure control device which includes a member adjusted to a position in accordance with scene lighting together with a diaphragm blade moved manually into engagement with the member with a cam surface on one of the blades and the member to vary the position of the blade in accordance with the position of the member. Preferably there is provided a galvanometer coil driven by light sensitive means and carrying a diaphragm blade and a needle together with a second diaphragm blade having a stepped cam for engaging the needle when the second blade is released manually and urged toward a closed position. The needle may travel along a slot in a mounting plate and one edge of the slot supports the needle when the needle is engaged by the second diaphragm blade. In another embodiment of the invention, a diaphragm blade carried by a galvanometer coil has a stepped cam thereon offset from the plane of the blade, and a second manually movable diaphragm blade is adapted to engage a step of the cam determined by the position of the coil.

Referring now in detail to the drawings, an automatic exposure control device 10 (FIG. 1) is mounted as a unit on an inner wall 11 of a camera 12 having an opening directly behind an aperture 13 formed by diaphragm blades 14 and 15 for passage of light from a lens (not shown) of the camera to expose a film frame behind the wall 11 when a manually operable shutter release slide 16 is actuated. The device 10 includes a mounting plate 17 supported by spacer studs 18 and mounting pin 22 on the wall 11. The shutter release slide is mounted slidably on pins 19 and 20 carried rigidly on the wall 11, the pin 20 having a head 20a retaining the slide against the wall and the slide having guide slots 16a and 16b therein. The slide is urged upwardly toward a shutter-latching position by a spring (not shown). A torsion spring 21 mounted on the mounting pin 22, is connected at one end to the slide 16 and the other end of the spring 21 projecting through an arcuate slot 17a in the plate 17 and hooked to the blade 14 to urge the blade 14 clockwise, as viewed in FIG. 1. The slide has a shutter latching portion 16c, which releases a master control member 23 of the shutter to open and close when the slide 16 is moved downwardly a predetermined distance by a manually operable release member (not shown) engaging cam surface 16d (FIG. 2) on the slide.

Figure 2:
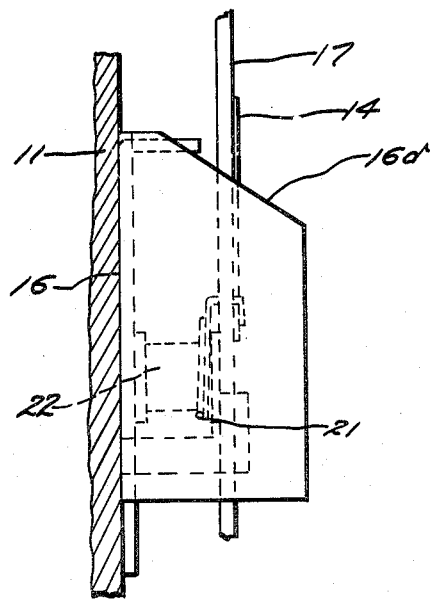
FIG. 2 is a side elevation view taken along line 2—2 of FIG. 1.
Figure 3:
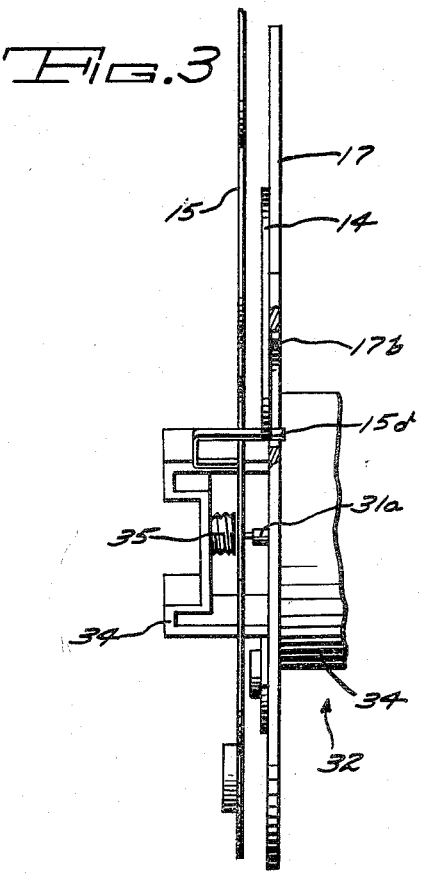
FIG. 3 is a side elevation view taken along line 3—3 of FIG. 1.
Figure 4:
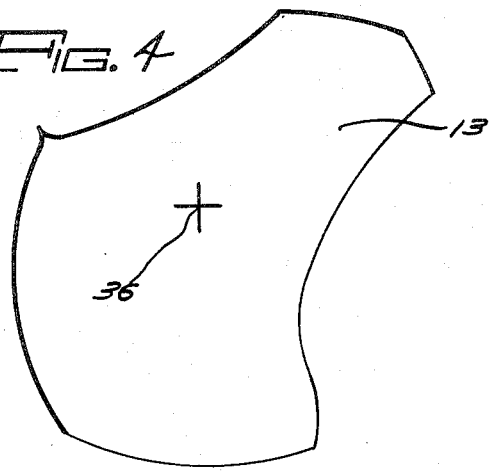
FIGS. 4, 5 and 6 are views of the effective apertures of the device for several settings of the exposure control device.
Figure 5:
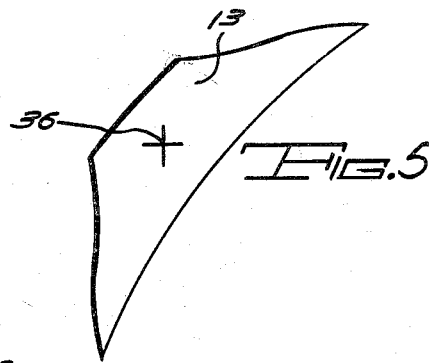
Figure 6:
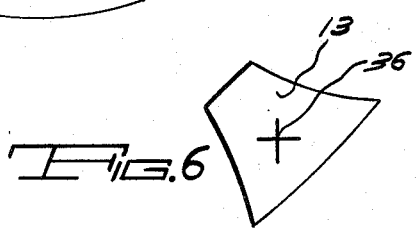

The automatic exposure control device 10 is a semi-needle-entrapment, semi-direct-driven device, the blade 15 being fixed to a rotor or coil 31 of galvanometer 32 mounted on the plate 17 and the blade 14 being mounted pivotally on the pin 22 and urged in a clockwise (diaphragm closing) direction, as viewed in FIG. 1, by the spring 21. The galvanometer 32 includes a stator 33 of known construction having permanent magnets therein and rigid straps 34 of which only one is shown are mounted rigidly on opposite ends of the stator and support jewel-type bearings 35 (FIG. 3) of known construction, which mount a shaft 31a of the coil 31 rotatably. The stator 33 is rigidly secured to the mounting plate 17, which has an arcuate slot 17b therein concentric with the shaft 31a. The blade 15 is of thin sheet metal with cut out portions 15a to minimize weight while retaining rigidity, and has a diaphragm portion 15b provided with an elongated, shaped slot 15c. The portion of the slot 15c intersecting a slot or notch 14a in the blade 14 and the intersecting portion of the slot 14a define the diaphragm aperture 13 for any given setting of the blades 14 and 15, the slots 14a and 15c being concentric with the respective axes of rotation of the blades 14 and 15, FIGS. 4, 5 and 6 illustrating the shape of the aperture 13 for representative settings of the diaphragm blades, the aperture 13 being substantially centered on optical axis 36 throughout the range of adjustment of the diaphragm.

As the shutter releasing or actuating slide 16 is moved manually downwardly, as viewed in FIG. 1, and before the master control member 23 is released, a blade supporting lug 16e of the slide, against which the spring 21 urges the blade 14, moves downwardly and the blade 14 is swung clockwise by the spring 21 to keep in engagement with the lug 16e until one of steps 14b of a stepped cam arm 14c engages a strap-like needle 15d of the blade 15. The needle 15d stops further movement of the blade 14 as the blade 14 follows the slide 16, which is moved on downwardly and triggers the shutter to make an exposure by releasing the master member 23 near the lower end of the travel of the slide. After the camera user releases the control member, the slide 16 returns back up to its initial position and the blade 14 is moved back to its retracted position by the slide 16. The needle 15d may be normally spaced closely to the bottom edge of the slot 17b and sufficiently resilient to be pressed by the spring urged blade against the bottom edge of the slot 17b. The blade 14 is positioned close to the plate 17 as illustrated in FIG. 3 so that the plate 17 supports substantially the entire force of the blade 14 on the needle 15d thereby relieving the bearings 35 and shaft 31a. The spring pressure on the blade 14 also is kept very low. The needle 15d can be constructed of thicker material than the blade 15 and brazed to the blade, and also may be of the same stock as and integral with the blade but doubled back upon itself to provide greater thickness, if desired. The steps 14b define a cam, but the needle engaging portion of each step is so shaped as it engages in face-to-face contact therewith so that there is no tendency to slide the needle relative to the step after engagement of the step and the needle has been made. The galvanometer is supplied with power in accordance with the scene lighting by known light sensitive means such as, for example, the photovoltaic photoelectric cell and circuit associated therewith of the type disclosed and claimed in Bagby et al. Patent 2,841,064, and, as the scene lighting increases in tensity, the coil 31 is rotated in a counter-clockwise (diaphragm closing) direction, as viewed in FIG. 1, against a known spring (not shown) until a balance is achieved between the electromotive force and the spring.

The slot 15c is large at its left hand end, as viewed in FIG. 1, to provide the largest aperture 13 when this portion is in the light path of the objective, and tapers with undulating width to the right to provide with the slot 14a the desired aperture 13 for each position of the blade 15. The range of rotation of the blade 15 is large and length of the slot 15c is correspondingly long so that fine adjustments of the aperture are effected. The mouth portion of the notch 14a is substantially semi-circular and of a diameter substantially equal to that of hole 17c in the plate 17 which defines the wide open aperture 13. The total range also keeps the ratio between the radius of movement of the slot 14a and the radius of movement of the slide contacting portion of the shoulder 14b as low as possible. The slot 14a has a short, narrow, tapered portion 14d which cooperates with the narrow portions of the slot 15c to define small apertures.

The blade 15 is light in weight and has a counterweight portion 15f to statically balance the blade by compensating for the diaphragm portion 15b and an indicator flag 15e. The flag 15e projects up into the field of view of viewfinder 41 of the camera when the diaphragm is in its largest aperture adjustment.

Figure 7:
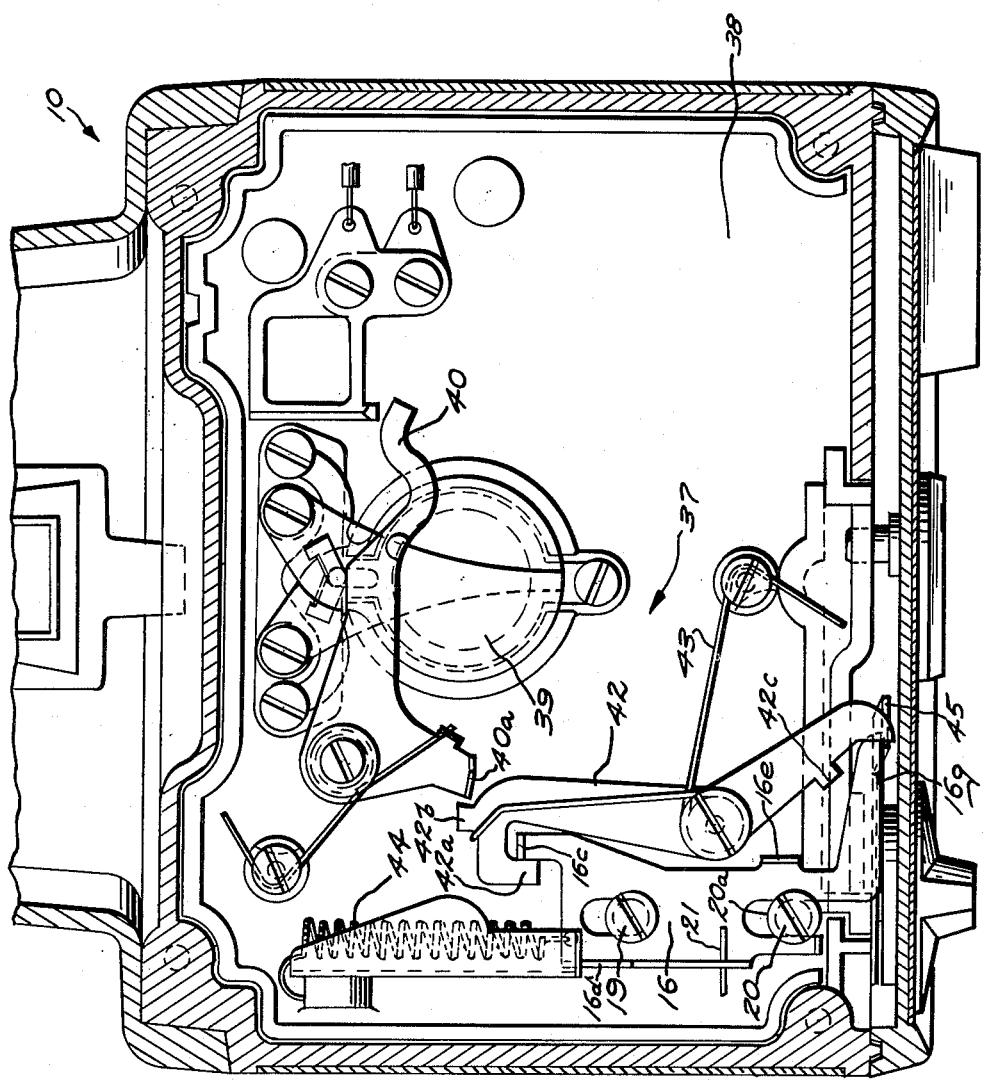
FIG. 7 is a vertical sectional view of the camera of FIG. 1 illustrating a shutter forming a part of the present invention.

Behind the plate 17, a shutter 37 (FIG. 7) is mounted on wall 38. The shutter is disclosed and certain features claimed in co-pending application Serial No. 76,886, filed December 19, 1960, by A. C. Mueller and assigned to the same assignee as the instant application. The shutter comprises a pair of blades 39 which are opened and closed through a pin and slot connection by actuating arm 40. The arm 40 is moved in a shutter-opening direction by a master control lever 42 when the slide 16 is moved downwardly and moves a trigger portion 16c out of engagement with tab 42a of the master control arm 42. This permits spring 43 to turn the lever 42 clockwise and cam portion 42b strikes tab 40a, drives the arm 40 to a position opening the blades, holds the arm 40 in this position and then moves past the tab 40a to permit the spring pressed arm 40 to reclose the shutter. The release of the arm 40 occurs after the diaphragm has been set for the proper exposure. After the shutter operating member is released, the plate 16 is returned upwardly to its starting position by the spring 44. This permits lug 42c to move under the tab 16e to prevent reactuation of the slide 16 until the film in the camera is wound. When the film is wound to present unexposed film to the framing aperture of the camera, the lever 45 engages the end of the lever 42 and moves the lever to a cocked position over the tab 16c which cams the arm 42a thereover as the lever 42 is cocked. Just before the shutter is triggered, a shoe 16g springs the lever 45 down out of the path of lever 42, the lever 45 springing back up after the shutter operating member is released by the user of the camera to permit the slide or plate 16 to return to its upper or normal position.

Figure 8:
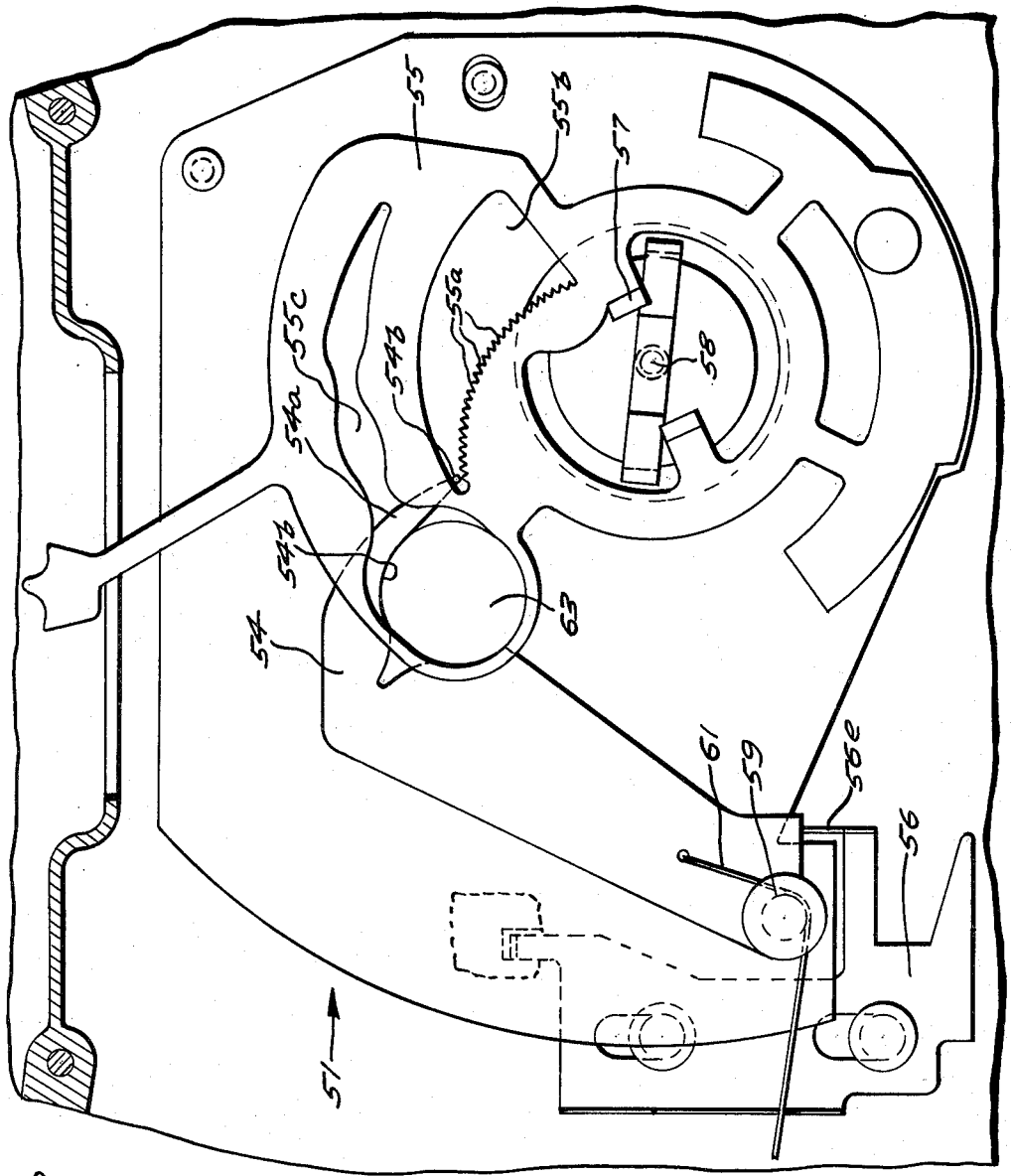
FIG. 8 is a fragmentary, partially sectional view of a camera having an automatic exposure control device forming an alternate embodiment of the invention.

An automatic exposure control device 51 (FIG. 8) of a camera 52 and forming an alternate embodiment of the invention is substantially like the control device 10 except as appears hereinbelow. The device 51 includes a needle-entrappable diaphragm blade 54 and a direct driven blade 55. The blade 54 is urged against lug 56e of shutter actuating slide 56 by spring 61. The construction and operation of the slide 56 are identical with those of the slide 16, and when slide 56 is slid downwardly, a pin 54b on arm 54a of the blade 54 moves into engagement with one of steps or notches 55a of the blade 55 and is trapped before the shutter is operated. The steps 55a define a cam relative to axis 58 of rotation of the blade 55 and galvanometer coil 57 and form the bottom edge of slot 55b in the blade 55. The pin 54b is trapped in the notches 55a and also locks the blade 55 in its adjusted position. Intersection of diaphragm slots 54b and 55c defines the apertures 63, the blade 54 being pivotal on stationary mounting pin 59.

The above automatic exposure control devices are rugged in construction and highly accurate in operation. Since the galvanometer driven blades 15 and 55 are carried by the galvanometer coils, no separate bearing structure is required for either of the blades 15 and 55, and also, since the galvanometers do not drive the blades 14 and 54, the bearing structures of the blades 14 and 54 need not be of the extremely low friction type and are very simple and inexpensive. Further, since only the blades 15 and 55 are directly driven by the galvanometer and these blades are very light in weight, the galvanometer may have a very low power output as compared with that required where the galvanometer must drive one or both diaphragm blades through mechanical coupling means.

While the invention is thus described, it is not wished to be limited to the precise details described, as changes may be readily made without departing from the spirit of the invention.

What is claimed is:

1. In an automatic exposure control device, electro-motive means, a first diaphragm blade driven by the electro-motive means, a second diaphragm blade, manually operable means for moving the second blade, and interengaging cam means carried by the blades for trapping the second diaphragm blade at a point in its movement determined by the position of the first diaphragm blade.

2. In an automatic exposure control device, galvanometer means, a member driven by the galvanometer means, a movable diaphragm blade having a portion for engaging the member and also having a tapered diaphragm opening, means mounting the blade for movement independently of the galvanometer means, and manually operable means for moving the blade in a closing direction into engagement with the member, said portion of the blade and the member being provided with cam-shaped interlocking portions for stopping the blade in a position determined by the position of the member, the interlocking portion of the member constituting a stop for limiting movement of the blade in a closing direction.

3. In an automatic exposure control device, a diaphragm blade having a tapered aperture and mounted pivotally, manually operable means for urging the blade in a diaphragm closing direction, a galvanometer having a rotatable portion, a cam carried by one of the blade and the rotatable portion, and a member carried by the other of the blade and the rotatable portion for engaging with the cam to limit movement of the blade in accordance with the position of the rotatable portion of the galvanometer.

4. In an automatic exposure control device, a galvanometer including rotatable means, a first diaphragm blade having a tapered aperture and fixed to the rotatable means and having a needle member projecting therefrom, and a manually operable diaphragm blade having a tapered aperture and a cam portion for engaging the needle member and being limited in closing movement by the needle.

5. The automatic exposure control device of claim 4 and including a stationary backing member extending along the path of the needle member and serving to support the needle member when the needle member is engaged by the cam portion of the manually operable diaphragm blade.

6. The automatic exposure control device of claim 3 wherein the cam is carried by the rotatable portion and the member is carried by the blade.

7. The automatic exposure control device of claim 3 wherein the cam is carried by the blade and the member is a needle-like element and is carried by the rotatable portion of the galvanometer.

8. In an automatic exposure control device, a galvanometer, a first diaphragm blade having a tapered opening and driven directly by the galvanometer and having a slot having a cam edge, and a manually operable diaphragm blade having a tapered opening and an arm portion for engaging the cam edge at a point thereon determined by the position of the first diaphragm blade.

9. In an automatic exposure control device, a mounting plate, a galvanometer mounted on the plate and having a rotatable coil, a diaphragm blade having a tapered opening and mounted pivotally on the plate at a point spaced from the galvanometer, manually operable means for urging the blade in a closing direction, and interengaging cam means carried by the coil and the blade for limiting closing movement of the blade in accordance with the rotative position of the coil.

10. In an automatic exposure control device, a mounting plate having an opening and an arcuate slot concentric with the opening, a first diaphragm blade pivotally mounted on one face of the plate and having an arm provided with a stepped cam, a galvanometer mounted in the opening and having a coil and bearing means for the coil, a second diaphragm blade mounted on the coil in an intersecting offset position relative to the first diaphragm blade and having a needle member projecting laterally thereof into the arcuate slot, and manually operable means for moving the first diaphragm blade along the plate until the cam portion thereof engages the needle member, one edge of the slot serving to support the needle member when the needle member is engaged by the first diaphragm blade.

11. The automatic exposure control device of claim 10 wherein the manually operable means includes a spring urging the first diaphragm blade toward engagement with the needle member and a shutter actuating slide having a holding portion engaging the first diaphragm blade and mounted slidably on the plate and normally urged to a position holding the first diaphragm blade out of engagement with the needle member, the slide being movable manually in a shutter actuating direction to permit the first diaphragm blade to follow the holding portion of the slide until the first diaphragm blade engages the needle member.

12. In an automatic exposure control device, a mounting plate, a galvanometer mounted on the plate and having a movable coil, a first diaphragm blade fixed to the coil and having a cam edge eccentric to the axis of rotation of the blade and the coil, a second diaphragm blade pivotally mounted on the plate and having a lateral projection for engaging the cam edge, and manually operable means for moving the second diaphragm blade in a diaphragm-closing direction until the lateral projection engages and is stopped by the cam edge.

13. The automatic exposure control device of claim 12, wherein the cam edge is defined by a series of notches.

14. In a shutter device, a mounting plate, a manually operable release plate movable along the mounting plate and having a latching tab formed thereon, means urging the release plate to a latching position, a shutter mechanism mounted on the mounting plate, a driving lever pivotally mounted on the mounting plate for driving the shutter mechanism and having a shoulder adapted to be latchingly engaged by the latching tab to retain the lever in a cocked position, the lever also having a notched portion adapted to lie in the path of a second tab on said release plate and prevent movement of the release plate after the release plate has been moved from its latching position to release the lever and returned to its latching position, the lever also having a recocking portion, and manually operable means for engaging the recocking portion of the lever to recock the lever.

15. In a shutter device, a mounting plate, a release plate mounted slidably on the mounting plate, a shutter mechanism mounted on the mounting plate, a spring driven driving member movable from a cocked position through a path of movement actuating the shutter mechanism, the release plate being provided with means for latching the driving member in the cocked position, the driving member having means for preventing movement of the plate in a releasing direction when the driving member has actuated the shutter mechanism, and manually operable means for moving the driving member to its cocked position.

References Cited in the file of this patent

UNITED STATES PATENTS

| | | |
|---|---|---|
| 2,051,061 | Tonnies | Aug. 18, 1936 |
| 2,061,909 | Karg | Nov. 24, 1936 |
| 2,525,549 | Hodges | Oct. 10, 1950 |
| 2,856,831 | Gipe | Oct. 21, 1958 |
| 2,887,025 | Rentschler | May 19, 1959 |
| 3,036,505 | Kelly | May 29, 1962 |
| 3,043,202 | Hahn | July 10, 1962 |

FOREIGN PATENTS

| | | |
|---|---|---|
| 1,197,148 | France | June 1, 1959 |